US009504995B2

(12) United States Patent
Burton et al.

(10) Patent No.: US 9,504,995 B2
(45) Date of Patent: Nov. 29, 2016

(54) SYNTHESIS OF MSE-FRAMEWORK TYPE MOLECULAR SIEVES

(71) Applicants: Allen W. Burton, Stewartsville, NJ (US); Scott J. Weigel, Allentown, PA (US)

(72) Inventors: Allen W. Burton, Stewartsville, NJ (US); Scott J. Weigel, Allentown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 490 days.

(21) Appl. No.: 14/054,038

(22) Filed: Oct. 15, 2013

(65) Prior Publication Data
US 2014/0140921 A1 May 22, 2014

Related U.S. Application Data

(60) Provisional application No. 61/727,182, filed on Nov. 16, 2012.

(51) Int. Cl.
*C01B 39/04* (2006.01)
*C01B 39/48* (2006.01)
*B01J 29/70* (2006.01)

(52) U.S. Cl.
CPC ............... *B01J 29/70* (2013.01); *C01B 39/04* (2013.01); *C01B 39/48* (2013.01)

(58) Field of Classification Search
CPC .......... C01B 39/04; C01B 39/48; B01J 29/70
See application file for complete search history.

(56) References Cited

U.S. PATENT DOCUMENTS

| 3,354,078 | A |   | 11/1967 | Miale et al. |
|---|---|---|---|---|
| 5,248,491 | A |   | 9/1993 | Skeels et al. |
| 6,049,018 | A | * | 4/2000 | Calabro ............... B01J 29/04 423/706 |
| 7,198,711 | B1 |   | 4/2007 | Chester et al. |
| 8,053,618 | B1 |   | 11/2011 | Moscoso et al. |
| 2009/0318696 | A1 |   | 12/2009 | Strohmaier et al. |
| 2010/0081775 | A1 |   | 4/2010 | Moscoso et al. |
| 2013/0095030 | A1 |   | 4/2013 | Burton |
| 2013/0115163 | A1 |   | 5/2013 | Weston et al. |
| 2013/0156690 | A1 |   | 6/2013 | Itabashi et al. |

FOREIGN PATENT DOCUMENTS

CN    1108213 A    9/1995

OTHER PUBLICATIONS

Moretti, et al., "Zeolite synthesis in the presence of organic components", Chimica E L'Industria, Jan. 1, 1985, vol. 67, No. 1-2, pp. 21-34, Societa Chimica Italiano, Milano, IT.
International Search Report with Written Opinion for PCT/US2013/064996 dated Feb. 18, 2014.
Dorset, Douglas L., Weston, Simon C., Dhingra, Sandeep S., "Crystal Structure of Zeolite MCM-68: A New Three-Dimensional Framework with Large Pores," Journal of Physical Chemistry B, 110, 2045 (2006).
Weisz, P.B., Miale, J.N., "Superactive Crystalline Aluminosilicate Hydrocarbon Catalysts", Journal of Catalysis, vol. 4, iss. 4, p. 527 (Aug. 1965).
Miale, J.N. Chen, N.Y., Weisz, P.B., "Catalysis by crystalline aluminosilicates: IV. Attainable catalytic cracking rate constants, and superactivity," Journal of Catalysis, vol. 6, iss. 2, p. 278 (Oct. 1966).
Olson, D.H., Haag, W.O., Lago, R.M., "Chemical and physical properties of the ZSM-5 substitutional series," Journal of Catalysis, vol. 61, iss. 2, p. 395 (1980).

* cited by examiner

*Primary Examiner* — David M Brunsman
(74) *Attorney, Agent, or Firm* — David M. Weisberg

(57) ABSTRACT

An aspect of the invention relates to a method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally but preferably a source of a trivalent element, X, a source of an alkali or alkaline earth metal, M, a source of a tetraethylammonium cation, Q1, and optionally a source of a second organic cation, Q2, which can include a cyclic nitrogen-containing ammonium cation.

10 Claims, No Drawings

SYNTHESIS OF MSE-FRAMEWORK TYPE MOLECULAR SIEVES

CROSS-REFERENCE TO RELATED APPLICATIONS

This application claims the benefit of U.S. Provisional Application Ser. No. 61/727,182, filed on Nov. 16, 2012; which is incorporated herein in its entirety by reference.

FIELD OF THE INVENTION

This invention relates to the synthesis of crystalline molecular sieves of the MSE framework-type, such as MCM-68, and to their use in organic conversion processes.

BACKGROUND OF THE INVENTION

MCM-68 is a single crystalline phase molecular sieve material which has a unique 3-dimensional channel structure comprising one 12-membered ring channel system and two 10-membered ring channel systems, in which the channels of each system extend perpendicular to the channels of the other systems and in which the 12-ring channels are generally straight and the 10-ring channels are tortuous (sinusoidal). The framework structure of MCM-68 has been assigned code MSE by the Structure Commission of the International Zeolite Association.

The composition and characterizing X-ray diffraction pattern of MCM-68 are disclosed in U.S. Pat. No. 6,049,018, which also describes the synthesis of the molecular sieve in the presence of a structure directing agent comprising the N,N,N',N'-tetraethylbicyclo[2.2.2]oct-7-ene-2,3:5,6-dipyrrolidinium dication. The entire contents of U.S. Pat. No. 6,049,018 are incorporated herein by reference.

U.S. Pat. No. 6,049,018 exemplifies the use of MCM-68 as a catalyst in aromatic alkylation and transalkylation reactions. In addition, U.S. Pat. No. 7,198,711 discloses that MCM-68 shows activity in the catalytic cracking of hydrocarbon feedstocks to produce an enhanced yield of butylenes and isobutene, with the MCM-68 either being the primary cracking catalyst or an additive component in conjunction with a conventional large pore cracking catalyst, such as zeolite Y.

The commercial development of MCM-68 has been hindered by the high cost of the N,N,N',N'-tetraethylbicyclo[2.2.2]oct-7-ene-2,3:5,6-dipyrrolidinium dication structure directing agent required in U.S. Pat. No. 6,049,018 for its synthesis and hence there has been significant interest in finding alternative, less expensive structure directing agents for the synthesis of MCM-68.

In U.S. Patent Application Publication No. 2009/0318696, it is stated that 1,1-dialkyl-4-cyclohexylpiperazin-1-ium cations and 1,1-dialkyl-4-alkylcyclohexylpiperazin-1-ium cations are effective as structure directing agents in the synthesis of MCM-68. U.S. Patent Application Publication No. 2009/0318696 describes the use of MCM-68 seeds in the synthesis of MCM-68.

In co-pending U.S. Ser. No. 13/649,283, various diammonium dications are taught to be effective as structure directing agents in the synthesis of MSE framework type materials such as MCM-68. In co-pending U.S. Serial No. 13/649,140, five- or six-membered ring-containing ammonium cations, optionally in addition to a diammonium dication, are taught to be effective as structure directing agents in the synthesis of MSE framework type materials such as MCM-68.

UZM-35 can have some similarities in structure to MSE framework type materials in general, and to MCM-68 in particular. U.S. Patent Application Publication No. 2010/0081775 discloses a method for synthesizing UZM-35 using simpler, singly-charged cations. This reference, however, does note that UZM-35 has a unique x-ray diffraction pattern, different from MCM-68, although the differences are not explicitly described therein.

According to the present invention, it has now been found that additional relatively simple cations described herein can be effective as structure directing agents in the synthesis of MCM-68.

SUMMARY OF THE INVENTION

In one aspect, the present invention relates to a method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally a source of a trivalent element, X (such as selected from at least one of aluminum, boron, gallium, iron, and chromium), a source of an alkali or alkaline earth metal, M, and a source of a tetraethylammonium cation, Q1.

In some embodiments, the tetravalent element, Y, can comprise silicon, the trivalent element, X, can comprise aluminum, and the alkali or alkaline earth metal, M, can comprise or be potassium and/or can comprise substantially no sodium.

Optionally, the reaction mixture can further comprise a source of a second organic cation, Q2, having one or both of the two following general structures:

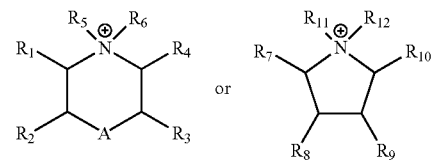

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_5$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety. When present, Q2 can in some embodiments have the six-membered ring structure above, wherein the at least 3 of the $R_1$-$R_4$ groups are hydrogen, and wherein at least one of the $R_5$ and $R_6$ groups is a methyl and/or ethyl group, preferably with A being an $>N-R_{15}$ group and $R_{15}$ being a cyclohexyl group, a phenyl group, or a $C_1$-$C_5$ alkyl substituted derivative thereof. In such embodiments, the molar ratio of Q1 to Q2 can range from about 1:5 to about 99:1.

In another aspect, the present invention relates to a crystalline molecular sieve having an MSE framework type, e.g., an MCM-68 molecular sieve, which molecular sieve contains within its pore structure a tetraethylammonium cation, Q1, and optionally also containing within its pore structure the second organic cation, Q2, described herein.

DETAILED DESCRIPTION OF THE EMBODIMENTS

Described herein is a method of synthesizing a crystalline molecular sieve having the MSE framework type, such as MCM-68, using a tetraethylammonium cation as (one of) the structure directing agent(s). Also described herein is the use of the calcined form of the resultant MSE framework type crystalline molecular sieve as a catalyst in organic conversion reactions, such as in aromatic alkylation and transalkylation reactions and in the catalytic cracking of hydrocarbon feedstocks.

MCM-68 is a synthetic porous single crystalline phase material that has a unique 3-dimensional channel system comprising one 12-membered ring channel system and two 10-membered ring channel systems, in which the channels of each system extend perpendicular to the channels of the other systems and in which the 12-ring channels are generally straight and the 10-ring channels are generally tortuous (sinusoidal). The framework structure of MCM-68 has been assigned code MSE by the Structure Commission of the International Zeolite Association.

In its calcined form, MCM-68 has an X-ray diffraction (XRD) pattern which is distinguished from the patterns of other known as-synthesized and/or thermally treated crystalline materials by the lines listed in Table 1 below.

TABLE 1

| d (Å) | Relative Intensity [100 × I/I$_o$] |
|---|---|
| 13.60 +/− 0.39 | S |
| 13.00 +/− 0.37 | VS |
| 10.92 +/− 0.31 | M |
| 10.10 +/− 0.29 | M |
| 9.18 +/− 0.26 | VS |
| 8.21 +/− 0.23 | W |
| 4.58 +/− 0.13 | W |
| 4.54 +/− 0.13 | W |
| 4.45 +/− 0.13 | VW-W |
| 4.32 +/− 0.12 | VW |
| 4.22 +/− 0.12 | VW |
| 4.10 +/− 0.12 | VS |
| 4.05 +/− 0.11 | M |
| 3.94 +/− 0.11 | M |
| 3.85 +/− 0.11 | M |
| 3.80 +/− 0.11 | VW |
| 3.40 +/− 0.10 | W |
| 3.24 +/− 0.09 | W |
| 2.90 +/− 0.08 | VW |

Though described as d-spacings herein, the peaks observed in XRD spectra have maxima in intensity, and the peak maxima correspond to the d-spacing "lines" listed herein. These X-ray diffraction data were collected with a Bruker D8 Discover diffraction system using Cu—Kα radiation and equipped with a Göbel mirror and HI-STAR area detector. The XRD spectra were recorded by measuring the diffraction pattern in two frames, the first frame from about 4° to about 20° 2θ, and the second from about 20° to about 36° 2θ. The two-dimensional diffraction patterns were integrated and converted to 1-dimensional plots of 2θ versus intensity using the Bruker GADDs software. The interplanar (d-) spacings were calculated in Angstrom units, and the relative intensities of the lines, I/I$_o$, adjusted as percentages of the intensity of the strongest line, I$_o$, above background, were derived with the use of Materials Data, Inc., Jade software peak search algorithm. The intensities were uncorrected for Lorentz and polarization effects. The relative intensities are given in terms of the symbols VS=very strong (80-100%), S=strong (60-80%), M=medium (40-60%), W=weak (20-40%), and VW=very weak (0-20%). In some embodiments, the peaks having intensities in the "very weak" category may be undetectable, whereas, in other embodiments, one or more (or indeed all) of the VW peak intensities may be detectable (thus non-zero and up to 20%). It should be understood that diffraction data listed for these samples as single lines may consist of multiple overlapping lines which under certain conditions, such as differences in crystallographic changes, may appear as resolved or partially resolved lines. Typically, crystallographic changes can include minor changes in unit cell parameters and/or changes in crystal symmetry, without a corresponding change in the topological structure. These minor effects, including changes in relative intensities, can additionally or alternately occur as a result of differences in cation content, framework composition, nature and degree of pore filling, crystal size and shape, preferred orientation, and thermal and/or hydrothermal history, inter alia.

The structure of MCM-68 is further discussed in U.S. Pat. No. 7,198,711 and in the *Journal of Physical Chemistry B*, 110, 2045 (2006).

MCM-68 has a chemical composition involving the molar relationship: $X_2O_3:(n)YO_2$, wherein X is a trivalent element selected from at least one of aluminum, boron, gallium, iron, and chromium, preferably at least including aluminum; Y is a tetravalent element selected from at least one of silicon, tin, titanium, vanadium, and germanium, preferably at least including silicon; and n is at least about 4, such as from about 4 to about 100,000, and can typically be from about 10 to about 1000, for example from about 10 to about 100.

MCM-68 is generally thermally stable and, in the calcined form, can exhibit a relatively high surface area (e.g., about 660 m$^2$/g with micropore volume of about 0.21 cc/g) and significant hydrocarbon sorption capacity, e.g.:

| n-Hexane sorption at ~75 torr, ~90° C. | ~10.8 wt % |
|---|---|
| Benzene sorption at ~75 torr, ~30° C. | ~18.8 wt % |
| 2,2-Dimethylbutane sorption at ~60 torr, ~120° C. | ~11.0 wt % |
| Mesitylene sorption at ~2 torr, ~100° C. | ~3.3 wt %. |

In its active, hydrogen form, MCM-68 can exhibit a relatively high acid activity, with an Alpha Value of about 900 to about 2000. Alpha Value is an approximate indication of the catalytic cracking activity of the catalyst compared to a standard catalyst, and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; and in the *Journal of Catalysis*, 4, 527 (1965); 6, 278 (1966); and 61, 395 (1980), each incorporated herein by reference as to that description. The experimental conditions of the test used herein include a constant temperature of ~538° C. and a variable flow rate, as described in detail in the *Journal of Catalysis*, 61, 395 (1980).

As disclosed in U.S. Pat. No. 6,049,018, MCM-68 has previously been synthesized using N,N,N',N'-tetraethylbicyclo[2.2.2]oct-7-ene-2,3:5,6-dipyrrolidinium dications as the structure directing agent. However, the high cost of this kind of structure directing agent may have hindered the commercial development of MCM-68.

The present method of synthesizing MCM-68 employs a tetraethylammonium cation, Q1, having the general formula $Et_4N^+$ as at least a portion of the structure directing agent(s).

Optionally, in addition to the tetraethylammonium cation, Q1, a second structure directing agent cation may be present, having one or both of the following two general structures (collectively Q2):

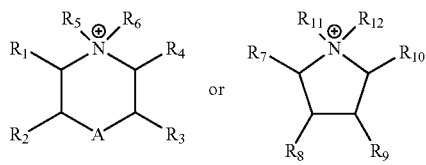

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a bulky $C_4$-$C_{12}$ hydrocarbon moiety (e.g., a cyclic, branched, and/or hydroxy-functionalized aliphatic and/or aromatic hydrocarbon moiety), such as a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_3$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety.

Suitable sources of the structure directing agent cations herein can include any salts of these cations that are not detrimental to the formation of the crystalline material MCM-68, for example, with halides (e.g., iodides) and/or hydroxides as counterions. Thus, though the ammonium nitrogen may not be covalently bonded to any hydroxyl groups, a hydroxyl ion may be an appropriate counterion.

Exemplary cyclic ammonium SDA cations (Q2) can include, but are not limited to, N,N-dialkyl-piperazinium cations (e.g., N,N-dimethyl-N'-cyclohexyl-piperazinium, N-methyl-N-ethyl-N'-cyclohexyl-piperazinium, N,N-diethyl-N'-cyclohexyl-piperazinium, N,N-dimethyl-N'-phenyl-piperazinium, N-methyl-N-ethyl-N'-phenyl-piperazinium, N,N-diethyl-N'-phenyl-piperazinium, N,N-dimethyl-N'-cyclopentyl-piperazinium, N-methyl-N-ethyl-N'-cyclopentyl-piperazinium, N,N-diethyl-N'-cyclopentyl-piperazinium, and the like, and combinations thereof), 4,4-dialkyl-piperidinium cations (e.g., 4-methyl-4-ethyl-piperidinium, 4-methyl-4-propyl-piperidinium, 4-methyl-4-butyl-piperidinium, 4,4-diethyl-piperidinium, 4-ethyl-4-propyl-piperidinium, 4-ethyl-4-butyl-piperidinium, and the like, and combinations thereof), N-alkyl-quinuclidinium cations (e.g., N-methyl-quinuclidinium, 3-hydroxy-N-methyl-quinuclidinium, and the like, and a combination thereof), 4,4-dialkyl-morpholinium cations (e.g., 4-methyl-4-ethyl-morpholinium, 4-methyl-4-propyl-morpholinium, 4-methyl-4-butyl-morpholinium, 4,4-diethyl-morpholinium, 4-ethyl-4-propyl-morpholinium, 4-ethyl-4-butyl-morpholinium, and the like, and combinations thereof), 4,4-dialkyl-pyrrolidinium cations (e.g., 4-methyl-4-ethyl-pyrrolidinium, 4-methyl-4-propyl-pyrrolidinium, 4-methyl-4-butyl-pyrrolidinium, 4,4-diethyl-pyrrolidinium, 4-ethyl-4-propyl-pyrrolidinium, 4-ethyl-4-butyl-pyrrolidinium, and the like, and combinations thereof), and the like, and combinations thereof.

Specifically when more than one cation source is used in the structure directing agent composition, the molar ratio of Q1 to Q2 can be at least about 1:9, e.g., at least about 1:7, at least about 1:5, at least about 1:4, at least about 1:3, at least about 1:2, at least about 1:1, at least about 3:2, at least about 2:1, at least about 5:2, at least about 3:1, at least about 4:1, at least about 5:1, at least about 7:1, at least about 9:1, at least about 19:1, or at least about 49:1. Additionally or alternately, when more than one cation source is used in the structure directing agent composition, the molar ratio of Q1 to Q2 can be about 999:1 or less, about 499:1 or less, about 199:1 or less, about 99:1 or less, about 49:1 or less, about 19:1 or less, about 9:1 or less, about 7:1 or less, about 5:1 or less, about 4:1 or less, about 3:1 or less, about 2:1 or less, or about 1:1 or less.

In the present method, a reaction mixture is produced comprising a source of water, a source of an oxide of a tetravalent element, Y, selected from at least one of silicon, tin, titanium, vanadium, and germanium, a source of an oxide of trivalent element, X, selected from at least one of aluminum, boron, gallium, iron, and chromium, a source of an alkali or alkaline earth metal, M, together with a source of Q1 cations and optionally a source of Q2 cations (with Q herein representing all structure directing cations, Q1+Q2).

Generally, the composition of the reaction mixture can be controlled so that the molar ratio $Q1/YO_2$ or $Q/YO_2$ ($[Q1+Q2]/YO_2$) in said reaction mixture is in the range from about 0.01 to about 1, e.g., from about 0.03 to about 0.7, from about 0.05 to about 0.5, or from about 0.07 to about 0.35. Additionally or alternately, the composition of the reaction mixture can be controlled by selecting one or more of the following molar ratios: $YO_2/X_2O_3$ from about 4 to about 200, e.g., from about 4 to about 150, from about 4 to about 120, from about 4 to about 100, from about 4 to about 80, from about 6 to about 200, from about 6 to about 150, from about 6 to about 120, from about 6 to about 100, from about 6 to about 80, from about 8 to about 200, from about 8 to about 150, from about 8 to about 120, from about 8 to about 100, from about 8 to about 80, from about 12 to about 200, from about 12 to about 150, from about 12 to about 120, from about 12 to about 100, from about 12 to about 80, from about 15 to about 200, from about 15 to about 150, from about 15 to about 120, from about 15 to about 100, from about 15 to about 80, from about 18 to about 200, from about 18 to about 150, from about 18 to about 120, from about 18 to about 100, or from about 18 to about 80; $H_2O/YO_2$ from about 5 to about 200, e.g., from about 5 to about 150, from about 5 to about 100, from about 5 to about 50, from about 5 to about 35, from about 10 to about 200, from about 10 to about 150, from about 10 to about 100, from about 10 to about 50, from about 10 to about 35, from about 14 to about 200, from about 14 to about 150, from about 14 to about 100, from about 14 to about 50, from about 14 to about 35, from about 18 to about 200, from about 18 to about 150, from about 18 to about 100, from about 18 to about 50, or from about 18 to about 35; $OH^-/YO_2$ from about 0.05 to about 1.5, e.g., from about 0.05 to about 1.3, from about 0.05 to about 1.2, from about 0.05 to about 1.1, from about 0.05 to about 1, from about 0.05 to about 0.9, from about 0.05 to about 0.85, from about 0.05 to about 0.8, from about 0.05 to about 0.75, from about 0.05 to about 0.7, from about 0.05 to about 0.65, from about 0.05 to about 0.6, from about 0.15 to about 1.5, from about 0.15 to about 1.3, from about 0.15 to about 1.2, from about 0.15 to about 1.1, from about 0.15 to about 1, from about 0.15 to about 0.9, from about 0.15 to about 0.85, from about 0.15 to about 0.8, from about 0.15 to about 0.75, from about 0.15 to about 0.7, from about 0.15 to about 0.65, from about 0.15 to about 0.6, from about 0.25 to about 1.5, from about 0.25 to about 1.3, from about 0.25 to about 1.2, from about 0.25 to about 1.1, from about 0.25 to about 1, from about 0.25 to about 0.9, from about 0.25 to about 0.85, from about 0.25 to about 0.8, from about 0.25 to about 0.75, from about 0.25 to about 0.7, from about 0.25 to about 0.65, from about 0.25 to about 0.6, from about 0.5 to about 1.5, from about 0.5 to about 1.3, from about 0.5 to about 1.2, from about 0.5 to about 1.1, from about 0.5 to about 1, from about 0.5 to about 0.9, from about 0.5 to about 0.85, from about 0.5 to about 0.8, from about 0.6 to about 1.5, from about 0.6 to about 1.3, from about 0.6 to about 1.2, from about 0.6 to about 1.1, from about 0.6 to about 1, from about 0.6 to about 0.9, from about 0.6 to about 0.85, from about 0.6 to about 0.8, from about 0.65 to about 1.5, from about 0.65 to about 1.3, from about 0.65 to about 1.2, from about 0.65 to about 1.1, from about 0.65 to about 1, from about 0.65 to about 0.9, from about 0.65 to about 0.85, from about 0.65 to about 0.8, from about 0.7 to about 1.5, from about 0.7 to about 1.3, from about 0.7 to about 1.2, from about 0.7 to about 1.1, from about 0.7 to about 1, from about 0.7 to about 0.9, from about 0.7 to about 0.85, from about 0.7 to about 0.8, from about 0.75 to about 1.5, from about 0.75 to about 1.3, from about 0.75 to about 1.2, from about 0.75 to about 1.1, from about 0.75 to about 1, from about 0.75 to about 0.9, or from about 0.75 to about 0.85; and $M/YO_2$ from about 0.05 to about 2, e.g., from about 0.05 to about 1.5, from about 0.05 to about 1.2, from about 0.05 to about 1.1, from about 0.05 to about 1, from about 0.05 to about 0.9, from about 0.05 to about 0.8, from about 0.05 to about 0.7, from about 0.05 to about 0.6, from about 0.10 to about 2, from about 0.10 to about 1.5, from about 0.10 to about 1.2, from about 0.10 to about 1.1, from about 0.10 to about 1, from about 0.10 to about 0.9, from about 0.10 to about 0.8, from about 0.10 to about 0.7, from about 0.10 to about 0.6, from about 0.15 to about 2, from about 0.15 to about 1.5, from about 0.15 to about 1.2, from about 0.15 to about 1.1, from about 0.15 to about 1, from about 0.15 to about 0.9, from about 0.15 to about 0.8, from about 0.15 to about 0.7, from about 0.15 to about 0.6, from about 0.20 to about 2, from about 0.20 to about 1.5, from about 0.20 to about 1.2, from about 0.20 to about 1.1, from about 0.20 to about 1, from about 0.20 to about 0.9, from about 0.20 to about 0.8, from about 0.20 to about 0.7, from about 0.20 to about 0.6, from about 0.30 to about 2, from about 0.30 to about 1.5, from about 0.30 to about 1.2, from about 0.30 to about 1.1, from about 0.30 to about 1, from about 0.30 to about 0.9, from about 0.30 to about 0.8, from about 0.40 to about 2, from about 0.40 to about 1.5, from about 0.40 to about 1.2, from about 0.40 to about 1.1, from about 0.40 to about 1, from about 0.40 to about 0.9, or from about 0.40 to about 0.8. It should be noted that, although molar ratios of $OH^-/YO_2$ are used throughout this description, it should be understood that such molar ratios are meant to encompass whatever the chemical nature of the non-detrimental counterions of M and Q, and are only expressed herein as $OH^-/YO_2$ because hydroxyl counterions were specifically used. Similarly, where specific examples of Y, X, M, and Q are mentioned herein in molar ratios, their ranges should be understood to extend generically to the variable, unless expressly disclaimed, and not necessarily merely limited to the individual species of the variable genus.

In certain embodiments, the reaction mixture can have a composition, in terms of mole ratios of oxides, within all of the following ranges:

| Reactants | Useful | Advantageous |
|---|---|---|
| $YO_2/X_2O_3$ | ~4 to ~200 | ~8 to ~120 |
| $H_2O/YO_2$ | ~5 to ~200 | ~10 to ~100 |
| $OH^-/YO_2$ | ~0.05 to ~1.5 | ~0.6 to ~1.2 |
| $M/YO_2$ | ~0.05 to ~2 | ~0.30 to ~1.1 |
| $Q/YO_2$ | ~0.01 to ~1 | ~0.03 to ~0.7 |

The reaction mixture can also optionally (but preferably) comprise seeds of MSE framework type molecular sieve, such as MCM-68, for example, such that the weight ratio of seeds/$YO_2$ in the reaction mixture can be between about 0.001 and about 0.3, such as between about 0.001 and about 0.2, between about 0.001 and about 0.1, between about 0.001 and about 0.08, between about 0.001 and about 0.05, between about 0.01 and about 0.3, between about 0.01 and about 0.2, between about 0.01 and about 0.1, between about 0.01 and about 0.08, between about 0.01 and about 0.05, between about 0.03 and about 0.3, between about 0.03 and about 0.2, between about 0.03 and about 0.1, or between about 0.03 and about 0.08.

The tetravalent element, Y, may comprise or be silicon, the trivalent element, X, may comprise or be aluminum, and the alkali or alkaline earth metal, M, may comprise at least one of sodium and potassium. When the alkali or alkaline earth metal, M, comprises potassium, the molar ratio of Na to the total metal M may be from 0 to about 0.9, for example, from 0 to about 0.5. Thus, in certain embodiments, the alkali or alkaline earth metal can comprise substantially no sodium (e.g., less than 5 wt % of M can be sodium, such as less than 3 wt %, less than 1 wt %, less than 0.5 wt %, less than 0.3 wt %, less than 0.1 wt %, less than 0.05 wt %, or 0 wt %); additionally or alternately, the reaction mixture may comprise no added sodium (i.e., though some sodium may be present as an impurity in one or more of the reaction mixture ingredients, no component is added specifically to introduce sodium to the reaction mixture—e.g., though potassium hydroxide may contain some sodium hydroxide impurity, no sodium hydroxide is added).

Suitable sources of silicon oxide that can be used to produce the reaction mixture described above can include, but are not limited to, colloidal silica, precipitated silica, potassium silicate, sodium silicate, fumed silica, and the like, as well as combinations thereof. Suitable sources of aluminum oxide can include, but are not limited to, hydrated aluminum oxides, such as boehmite, gibbsite, and pseudo-boehmite, especially gibbsite, as well as oxygen-containing aluminum salts, such as aluminum nitrate, and the like, as well as combinations thereof. Suitable sources of alkali metal can include sodium and/or potassium hydroxide.

Irrespective of the source of the structure directing agent (s), when the reaction mixture has been prepared, crystallization to produce the desired MCM-68 can be conducted under either static or stirred conditions in a suitable reactor vessel, such as for example, polypropylene jars or stainless steel autoclaves optionally lined with Teflon®, e.g., at a temperature between about 100° C. and about 200° C. for up to about 28 days, such as at a temperature between about 145° C. and about 175° C. for about 24 hours to about 170 hours. Thereafter, the crystals can be separated from the liquid and recovered.

The product of the synthesis reaction can advantageously comprise or be a crystalline molecular sieve having the MSE framework type and containing within its pore structure the structure directing agent(s) described herein. The resultant as-synthesized material can have an X-ray diffraction pattern distinguishable from the patterns of other known as-synthesized or thermally treated crystalline materials.

As-synthesized crystalline molecular sieve containing structure directing agent(s) within its pore structure can normally be activated before use in such a manner as to substantially remove the structure directing agent(s) from the molecular sieve, leaving active catalytic sites within the microporous channels of the molecular sieve open for contact with a feedstock. The activation process can typically be accomplished by heating the molecular sieve at a temperature from about 200° C. to about 800° C. for an appropriate period of time in the presence of an oxygen-containing gas. Alternately, activation can be accomplished (e.g., the SDA effectively removed) by exposure to ozone at temperatures below about 500° C., e.g., about 300° C. or less.

To the extent desired, the original alkali (and/or alkaline earth) cations of the as-synthesized material can be replaced in accordance with techniques well known in the art, at least in part, e.g., by ion exchange with other cations, which can include, but are not limited to, metal ions, hydrogen ions, hydrogen ion precursors, e.g., ammonium ions, and the like, and mixtures thereof. Particularly preferred exchange cations, when present, can include those that can tailor the catalytic activity for certain hydrocarbon conversion reactions (e.g., hydrogen, rare earth metals, and metals of Groups 3, 4, 5, 6, 7, 8, 9, 10, 11, 12, and 13 of the Periodic Table of the Elements; when the cations are alkali metal cations, the exchange cations can additionally or alternately include alkaline earth, or Group 2, metals).

The crystalline molecular sieve produced by the present process can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of a temperature from about 250° C. to about 500° C., a pressure from about 0 psig to 500 psig (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 $hr^{-1}$ to about 10,000 $hr^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 $hr^{-1}$ to about 20 $hr^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 $hr^{-1}$ to about 50 $hr^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 $hr^{-1}$ to about 10 $hr^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 $hr^{-1}$ to about 10 $hr^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 $hr^{-1}$ to about 10 $hr^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 $hr^{-1}$ to about 10 $hr^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 $hr^{-1}$ to about 20 $hr^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 $hr^{-1}$ to about 500 $hr^{-1}$; and (m) a hydrocarbon trap (e.g., pre-catalytic converter adsorbent) for cold start emissions in motor vehicles.

As described in U.S. Pat. No. 7,198,711, MCM-68 may be used as an additive component in conjunction with a conventional cracking catalyst, such as a large pore molecular sieve having a pore size greater than about 7 Angstroms.

As in the case of many catalysts, it may be desirable to incorporate the molecular sieve produced by the present process with another material resistant to the temperatures and other conditions employed in organic conversion processes. Such materials can include active and inactive materials and synthetic or naturally occurring zeolites, as well as inorganic materials such as clays, silica, and/or metal oxides such as alumina. The latter may be naturally occurring and/or in the form of gelatinous precipitates/gels including mixtures of silica and metal oxides. Use of a material in conjunction with the molecular sieve produced by the present process (i.e., combined therewith and/or present during synthesis of the new crystal), which is active, can tend to change the conversion capability and/or selectivity of the catalyst in certain organic conversion processes. Inactive materials suitably tend to serve merely as diluents, e.g., to control the amount of conversion in a given process so that products can be obtained economically and orderly, for instance without employing too many other means for controlling the rate of reaction. These inventive materials may be incorporated into naturally occurring clays, e.g., bentonite and/or kaolin, to improve the crush strength of the catalyst under commercial operating conditions. Said materials (i.e., clays, oxides, etc.) can additionally or alternately function as binders for the catalyst. It can be desirable to provide a catalyst having good crush strength, because, in commercial use, it can often be desirable to prevent the catalyst from breaking down into powder-like materials. These clay and/or oxide binders have been employed normally only for the purpose of improving the crush strength of the catalyst.

Naturally occurring clays that can be composited with the molecular sieve produced by the present process can include, but are not limited to, the montmorillonite and kaolin families, which include the subbentonites and the kaolins commonly known as Dixie, McNamee, Georgia, and Florida clays and/or others in which the main mineral constituent can be halloysite, kaolinite, dickite, nacrite, and/or anauxite. Such clays can be used in the raw state as originally mined and/or initially subjected to calcination, acid treatment, and/or chemical modification. Binders useful for compositing with the molecular sieve produced by the present process can additionally or alternately include inorganic oxides, such as silica, zirconia, titania, magnesia, beryllia, alumina, and mixtures thereof.

Additionally or alternately, the molecular sieve produced by the present process can be composited with a porous matrix material such as silica-alumina, silica-magnesia, silica-zirconia, silica-thoria, silica-beryllia, silica-titania, and/or ternary compositions such as silica-alumina-thoria, silica-alumina-zirconia silica-alumina-magnesia, and silica-magnesia-zirconia.

The relative proportions of finely divided crystalline molecular sieve material and inorganic oxide matrix vary widely, with the crystal content ranging from about 1% to about 90% by weight and more usually, particularly when the composite is prepared in the form of beads or extrudates, ranging from about 2% to about 80% by weight of the composite.

Additionally or alternately, the present invention can include one or more of the following embodiments.

Embodiment 1

A method of synthesizing a crystalline molecular sieve having an MSE framework type, the method comprising crystallizing a reaction mixture comprising a source of water, a source of an oxide of a tetravalent element, Y, selected from at least one of silicon, tin, titanium, vanadium, and germanium, optionally a source of a trivalent element, X, a source of an alkali or alkaline earth metal, M, and a source of a tetraethylammonium cation, Q1.

Embodiment 2

The method of any one of the previous embodiments, wherein said reaction mixture comprises a source of an oxide of trivalent element, X, selected from at least one of aluminum, boron, gallium, iron, and chromium.

Embodiment 3

The method of any one of the previous embodiments, wherein the tetravalent element, Y, comprises silicon, the trivalent element, X, comprises aluminum, and the alkali or alkaline earth metal, M, comprises potassium.

Embodiment 4

The method of any one of the previous embodiments, wherein the alkali or alkaline earth metal, M, comprises substantially no sodium.

Embodiment 5

The method of embodiment 1, wherein one or more of the following are satisfied: a total molar ratio of tetraethylammonium cation, Q1, and/or of total SDA cations (Q1 plus Q2, when present) to oxide of tetravalent element, Y, in said reaction mixture is from about 0.01 to about 1, e.g., from about 0.03 to 0.7; a molar ratio of oxide of tetravalent element, Y, to oxide of trivalent element, X, in general form $YO_2/X_2O_3$, in said reaction mixture is from about 4 to about 200, e.g., from about 8 to about 120; a molar ratio of water to oxide of tetravalent element, Y, in said reaction mixture is from about 5 to about 200, e.g., from about 10 to about 100; a molar ratio of hydroxyl group concentration to oxide of tetravalent element, Y, in said reaction mixture is from about 0.05 to about 1.5, e.g., from about 0.6 to about 1.2; a molar ratio of alkali or alkaline earth metal, M, to oxide of tetravalent element, Y, in said reaction mixture is from about 0.05 to about 2, e.g., from about 0.30 to about 1.1; and seeds of an MSE framework type molecular sieve are present in an amount such that a weight ratio of seeds to oxide of tetravalent element, Y, in said reaction mixture is between about 0.001 and about 0.3, e.g., from about 0.01 to about 0.2.

Embodiment 6

The method of any one of the previous embodiments, wherein the reaction mixture further comprises a source of a second organic cation, Q2, having one or both of the two following general structures:

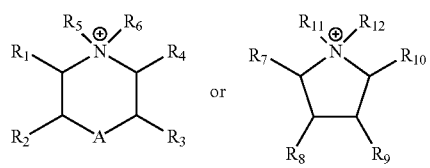

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_5$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety.

Embodiment 7

A crystalline molecular sieve having an MSE framework type, e.g., an MCM-68 molecular sieve, which molecular sieve contains within its pore structure a tetraethylammonium cation, Q1.

Embodiment 8

The crystalline molecular sieve of embodiment 7, further containing within its pore structure a second organic cation, Q2, having one or both of the two following general structures:

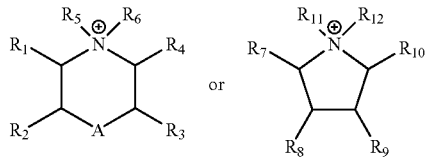

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_5$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety.

Embodiment 9

The method of embodiment 6 or the crystalline molecular sieve of embodiment 8, wherein the at least 3 of the $R_1$-$R_4$ groups or the $R_7$-$R_{10}$ groups are hydrogen, and wherein at least one of the $R_5$ and $R_6$ groups or at least one of the $R_{11}$ and $R_{12}$ groups is a methyl and/or ethyl group.

Embodiment 10

The method or crystalline molecular sieve of embodiment 9, wherein A is an $>N$—$R_{15}$ group, and where $R_{15}$ is a cyclohexyl group, a phenyl group, or a $C_1$-$C_5$ alkyl substituted derivative thereof.

Embodiment 11

The method or crystalline molecular sieve of embodiment 10, wherein the tetraethylammonium cation, Q1, and the second organic cation, Q2, are present in the reaction mixture in a molar ratio from about 1:5 to about 99:1.

EXAMPLES

In order to more fully illustrate the nature of the invention and the manner of practicing same, the following examples are presented.

Examples 1-4

Tetraethylammonium Cations as SDAs for MSE Material

In Example 1, about 1.89 grams of tetraethylammonium hydroxide (TEAOH) solution (~35 wt % in water) was added to about 4.70 grams deionized water inside a ~23-mL Teflon™ insert for a steel Parr autoclave. To this solution, about 0.48 grams of potassium hydroxide pellets (~88 wt % KOH in water) was added and mixed to dissolve. About 0.03 grams of Alcoa™ C-31 alumina trihydrate was then mixed with the solution, and about 2.25 grams of Ludox™ AS-40 silica (~40 wt % colloidal silica in water) was also added. About 0.04 grams of MCM-68 seeds (originating from crystals made using N,N-dimethyl-N'-cyclohexylpiperazinium hydroxide SDA) were added to the suspension. The Teflon™ liner was then capped and sealed inside the steel autoclave. The autoclave was then placed in a spit within an oven at about 160° C. under tumbling conditions (~30 rpm) for approximately 1 day. After workup of the solid product, powder XRD (Figure 1) appeared to show a predominantly MCM-68 pattern with a minor gibbsite phase. This recipe exhibited an Si/Al ratio of about 39, an OH⁻/Si ratio of about 0.8 (TEAOH/Si≈0.5; KOH/Si≈0.3), a K/Si ratio of about 0.3, an SDA/Si ratio of about 0.5, a water to Si ratio of about 27, and a seed/Si mass ratio of about 0.04.

In Example 2, about 1.89 grams of tetraethylammonium hydroxide (TEAOH) solution (~35 wt % in water) was added to about 4.70 grams deionized water inside a ~23-mL Teflon™ insert for a steel Parr autoclave. To this solution, about 0.48 grams of potassium hydroxide pellets (~88 wt % KOH in water) was added and mixed to dissolve. About 0.03 grams of Alcoa™ C-31 alumina trihydrate was then mixed with the solution, and about 2.25 grams of Ludox™ AS-40 silica (~40 wt % colloidal silica in water) was also added. About 0.04 grams of MCM-68 seeds (originating from crystals made using N,N-dimethyl-N'-cyclohexylpiperazinium hydroxide SDA) were added to the suspension. The Teflon™ liner was then capped and sealed inside the steel autoclave. The autoclave was then placed in a spit within an oven at about 160° C. under tumbling conditions (~30 rpm) for approximately 3 days. After workup of the solid product, powder XRD (Figure 1) appeared to show relatively pure phase MCM-68 with a (solid product) yield of about 0.24 grams. This recipe exhibited an Si/Al ratio of about 39, an OH⁻/Si ratio of about 0.8 (TEAOH/Si≈0.5; KOH/Si≈0.3), a K/Si ratio of about 0.3, an SDA/Si ratio of about 0.5, a water to Si ratio of about 27, and a seed/Si mass ratio of about 0.04.

In Example 3, about 1.89 grams of tetraethylammonium hydroxide (TEAOH) solution (~35 wt % in water) was added to about 4.72 grams deionized water inside a ~23-mL Teflon™ insert for a steel Parr autoclave. To this solution, about 0.48 grams of potassium hydroxide pellets (~88 wt % KOH in water) was added and mixed to dissolve. About 0.047 grams of Alcoa™ C-31 alumina trihydrate was then mixed with the solution, and about 2.25 grams of Ludox™ AS-40 silica (~40 wt % colloidal silica in water) was also added. About 0.04 grams of MCM-68 seeds (originating from crystals made using N,N-dimethyl-N'-cyclohexylpiperazinium hydroxide SDA) were added to the suspension. The Teflon™ liner was then capped and sealed inside the steel autoclave. The autoclave was then placed in a spit within an oven at about 160° C. under tumbling conditions (~30 rpm) for approximately 2 days. After workup of the solid product, powder XRD (Figure 1) appeared to show a predominantly MCM-68 pattern with a minor gibbsite phase. The solid yield of this product was about 0.24 grams. This recipe exhibited an Si/Al ratio of about 25, an OH⁻/Si ratio of about 0.8, a K/Si ratio of about 0.5, an SDA/Si ratio of about 0.30, a water to Si ratio of about 27, and a seed/Si mass ratio of about 0.04.

In Example 4, about 68.2 grams of potassium hydroxide pellets (~88 wt % KOH in water) were dissolved in about 668 grams of deionized water, which was heated slightly above room temperature in a Teflon™-coated beaker. While the solution was still hot, about 4.3 grams of aluminum hydroxide (Al(OH)$_3$ dried gel) was added and allowed to dissolve/disperse. Thereafter, about 287 grams of tetraethylammonium hydroxide (TEAOH) solution (Q1, ~35 wt % in water) was incorporated into the aluminate mixture until the solution was approximately homogeneous. To this solution, about 44.1 grams of N,N-dimethyl-4-cyclohexylpiperazinium (Q2, ~29 wt % in water) was added, and the resulting mixture was stirred for about 5 minutes. About 5.7 grams of MCM-68 seeds (originating from crystals made using N,N-dimethyl-N'-cyclohexylpiperazinium hydroxide SDA) were then added thereto, and the resulting mixture was stirred for another ~5 minutes. About 320 grams of Ludox™ AS-40 silica (~40 wt % colloidal silica in water) was then slowly added thereto. The resulting gel was mixed for about 30 minutes, and then the mixed gel was placed in a stainless steel ~2-Liter autoclave. The autoclave-charged mixture was stirred at about 250 rpm, while ramping the temperature to about 160° C. over approximately 1 hour. The mixture was heated and stirred for about 2 days. After workup of the solid product (in this case, filtration, washing with deionized water, and drying at ~120° C.), powder XRD appeared to show relatively pure phase MCM-68. This recipe exhibited an Si/Al ratio of about 39, an OH⁻/Si ratio of about 0.85 (total SDA/Si≈0.35; KOH/Si≈0.50), a K/Si ratio of about 0.50, a Q1/Si ratio of about 0.32, a Q2/Si ratio of about 0.03 (and thus a total Q/Si ratio of about 0.35), a water to Si ratio of about 28, and a seed/Si mass ratio of about 0.045.

Comparative Exs. 5-6

TEA Cation SDAs Unsuccessful in Producing MSE

In Comparative Example 5, about 0.29 grams of potassium hydroxide pellets (~88 wt % KOH in water) and about 0.30 grams of potassium nitrate (KNO$_3$) were dissolved in about 4.72 grams of deionized water inside a ~23-mL Teflon™ insert for a steel Parr autoclave. To this solution, about 1.89 grams of tetraethylammonium hydroxide (TEAOH) solution (~35 wt % in water) was added. Then, about 0.47 grams of aluminum hydroxide (Al(OH)$_3$ dried gel) was mixed by hand into the solution. About 2.25 grams of Ludox™ AS-40 silica (~40 wt % colloidal silica in water) and about 0.40 grams of MCM-68 seeds (originating from crystals made using N,N-dimethyl-N'-cyclohexylpiperazinium hydroxide SDA) were then added to the suspension. The Teflon™ liner was then capped and sealed inside the steel autoclave. The autoclave was then placed in a spit within an oven at about 160° C. under tumbling conditions (~30 rpm) for approximately 2 days. After workup of the solid product, powder XRD appeared to show a ZSM-5 product.

This recipe exhibited an Si/Al ratio of about 25, an OH⁻/Si ratio of about 0.6 (TEAOH/Si≈KOH/Si≈0.3), and a KNO$_3$/Si ratio of about 0.2 (resulting in a total K/Si ratio of about 0.8).

In Comparative Example 6, about 0.29 grams of potassium hydroxide pellets (~88 wt % KOH in water) and about 0.61 grams of potassium nitrate (KNO$_3$) were dissolved in about 4.72 grams of deionized water inside a ~23-mL Teflon™ insert for a steel Parr autoclave. To this solution, about 1.89 grams of tetraethylammonium hydroxide (TEAOH) solution (~35 wt % in water) was added. Then, about 0.78 grams of aluminum hydroxide (Al(OH)$_3$ dried gel) was mixed by hand into the solution. About 2.25 grams of Ludox™ AS-40 silica (~40 wt % colloidal silica in water) and about 0.40 grams of MCM-68 seeds (originating from crystals made using N,N-dimethyl-N'-cyclohexylpiperazinium hydroxide SDA) were then added to the suspension. The Teflon™ liner was then capped and sealed inside the steel autoclave. The autoclave was then placed in a spit within an oven at about 160° C. under tumbling conditions (~30 rpm) for approximately 2 days. After workup of the solid product, powder XRD appeared to show a product comprising a mixed phase of ZSM-5 and potassium hydrogen silicate.

This recipe exhibited an Si/Al ratio of about 15, an OH⁻/Si ratio of about 0.4 (TEAOH/Si≈0.3; KOH/Si≈0.1), and a KNO$_3$/Si ratio of about 0.4 (resulting in a total K/Si ratio of about 0.8).

Comparative Example 7

TEA Cation SDA without Seeds Unsuccessful in Producing MSE Material

In Comparative Examples 7-8, about 1.89 g of 35% tetraethylammonium hydroxide (TEAOH) solution (~35 wt % in water), about 0.49 grams of potassium hydroxide pellets (~88 wt % KOH in water), and about 4.7 grams of deionized water were mixed together to create a solution inside each of two ~23-mL Teflon™ inserts for a steel Parr autoclave. Then, about 0.047 grams of aluminum hydroxide (Al(OH)$_3$ dried gel) and about 2.25 grams of Ludox™ AS-40 silica (~40 wt % colloidal silica in water) were added to each solution. Each Teflon™ liner was then capped and sealed inside the steel autoclave. The autoclaves were then placed in a spit within an oven at about 160° C. under tumbling conditions (~30 rpm) for approximately 2 days (Comparative Example 7) and approximately 4 days (Comparative Example 8).

After workup of the solid product of Comparative Example 7, powder XRD appeared to show a predominantly amorphous product with minor zeolite beta and minor gibbsite phases detectable. After workup of the solid product of Comparative Example 8, powder XRD appeared to show a predominantly zeolite beta product.

These recipes each exhibited an Si/Al ratio of about 25, an OH⁻/Si ratio of about 0.8, a K/Si ratio of about 0.5, an SDA/Si ratio of about 0.3, and a water to Si ratio of about 27.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of synthesizing a crystalline molecular sieve having an MSE framework type, the method comprising:
    forming a reaction mixture comprising a source of water,
        a source of an oxide of a tetravalent element, Y, selected from at least one of silicon, tin, titanium, vanadium, and germanium, and comprising silicon, a source of a trivalent element, X, comprising aluminum, a source of an alkali or alkaline earth metal, M, comprising potassium but substantially no sodium, a source of a tetraethylammonium cation, Q1, and a source of MSE framework-type seeds in an amount such that a weight ratio of seeds to oxide or tetravalent element, Y, in said reaction mixture is between about 0.001 and about 0.3, wherein one or more of the following are satisfied: a total molar ratio of tetraethylammonium cation, Q1, to oxide of tetravalent element, Y, in said reaction mixture is from about 0.01 to about 1; a molar ratio of oxide of tetravalent element, Y, to oxide of trivalent element, X, in general form $YO_2/X_2O_3$, in said reaction mixture is from about 4 to about 200; a molar ratio of water to oxide of tetravalent element, Y, in said reaction mixture is from about 5 to about 200; and a molar ratio of hydroxyl group concentration to oxide of tetravalent element, Y, in said reaction mixture is from about 0.05 to about 1; a molar ratio of alkali or alkaline earth metal, M, to oxide of tetravalent element, Y, in said reaction mixture is from about 0.05 to about 2;

crystallizing the reaction mixture at a temperature between about 100° C. and about 200° C. for up to about 28 days to form the crystalline molecular sieve having an MSE framework type; and recovering the crystalline molecular sieve formed during crystallization.

2. The method of claim 1, wherein the source of the oxide of trivalent element, X, is additionally selected from one or more of boron, gallium, iron, and chromium.

3. The method of claim 1, wherein one or more of the following are satisfied:
a total molar ratio of tetraethylammonium cation, Q1, to oxide of tetravalent element, Y, in said reaction mixture is from about 0.03 to about 0.7;
a molar ratio of oxide of tetravalent element, Y, to oxide of trivalent element, X, in general form $YO_2/X_2O_3$, in said reaction mixture is from about 8 to about 120;
a molar ratio of water to oxide of tetravalent element, Y, in said reaction mixture is from about 10 to about 100;
a molar ratio of hydroxyl group concentration to oxide of tetravalent element, Y, in said reaction mixture is from about 0.6 to about 1.2;
a molar ratio of alkali or alkaline earth metal, M, to oxide of tetravalent element, Y, in said reaction mixture is from about 0.30 to about 1.1; and
seeds of an MSE framework type molecular sieve are present in an amount such that a weight ratio of seeds to oxide of tetravalent element, Y, in said reaction mixture is between about 0.01 and about 0.2.

4. The method of claim 1, wherein the reaction mixture further comprises a source of a second organic cation, Q2, having one or both of the two following general structures:

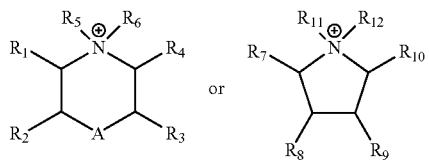

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_5$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety.

5. The method of claim 4, wherein the at least 3 of the $R_1$-$R_4$ groups or the $R_7$-$R_{10}$ groups are hydrogen, and wherein at least one of the $R_5$ and $R_6$ groups or at least one of the $R_{11}$ and $R_{12}$ groups is a methyl and/or ethyl group.

6. The method of claim 5, wherein A is an $>N$—$R_{15}$ group, and where $R_{15}$ is a cyclohexyl group, a phenyl group, or a $C_1$-$C_5$ alkyl substituted derivative thereof.

7. The method of claim 6, wherein the tetraethylammonium cation, Q1, and the second organic cation, Q2, are present in the reaction mixture in a molar ratio from about 1:5 to about 99:1.

8. The method of claim 1, wherein the crystalline molecular sieve is MCM-68.

9. A crystalline molecular sieve having an MSE framework type and containing within its pore structure a tetraethylammonium cation, Q1, further containing within its pore structure a second organic cation, Q2, having at least one of the two following general structures:

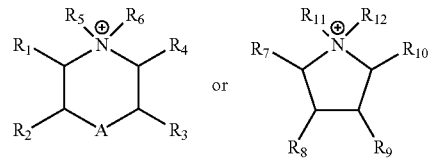

where A is a $>CR_{13}R_{14}$ group, a $>C=O$ group, an $>NR_{15}$, or an $>O$ group, where $R_1$, $R_2$, $R_3$, $R_4$, $R_7$, $R_8$, $R_9$, and $R_{10}$ are each independently hydrogen, a hydroxyl group, or a $C_1$-$C_5$ hydrocarbon chain, where $R_{13}$ and $R_{14}$ are each independently hydrogen or a $C_1$-$C_5$ hydrocarbon chain, where $R_5$, $R_6$, $R_{11}$, and $R_{12}$ are each independently a $C_1$-$C_5$ hydrocarbon chain, where $R_{15}$ is a cyclohexyl group, a cyclopentyl group, a phenyl group, a $C_1$-$C_5$ alkyl substituted derivative thereof, a $C_1$-$C_5$ alkoxy-substituted derivative thereof, or a $C_1$-$C_5$ dialkyl substituted derivative thereof, and where one of the $R_5$ and $R_6$ groups can alternately be connected to one of the $R_{13}$ and $R_{14}$ groups to form a $C_1$-$C_5$ hydrocarbon linking moiety.

10. The crystalline molecular sieve of claim 9, which is MCM-68.

* * * * *